United States Patent [19]

Enicks

[11] 4,173,814
[45] Nov. 13, 1979

[54] PAD MEMBER METHOD OF MANUFACTURE

[76] Inventor: James H. Enicks, Meadownbrook La., Box 247, Blawenburg, N.J. 08504

[21] Appl. No.: 813,447

[22] Filed: Jul. 7, 1977

[51] Int. Cl.² .............................................. B29D 27/04
[52] U.S. Cl. ........................................ 29/417; 29/428; 264/45.8; 264/46.4; 264/321; 264/DIG. 60
[58] Field of Search ............. 264/45.8, 321, DIG. 60, 264/46.4; 156/322; 29/417, 428

[56] References Cited

U.S. PATENT DOCUMENTS

| | | | |
|---|---|---|---|
| 2,888,975 | 6/1959 | Benedict | 156/322 X |
| 2,920,977 | 1/1960 | Adams | 264/45.8 X |
| 2,961,332 | 11/1960 | Nairn | 264/45.8 X |
| 3,446,880 | 5/1969 | Enicks | 264/321 X |
| 3,564,602 | 2/1971 | Peck | 264/DIG. 60 |
| 3,845,182 | 10/1974 | Biskup et al. | 264/DIG. 60 |
| 3,904,720 | 9/1975 | Sjostrand | 264/DIG. 60 |
| 4,055,613 | 10/1977 | Kapral | 264/DIG. 60 |

OTHER PUBLICATIONS

Whittington, Lloyd R. "Whittington's Dictionary of Plastics," Stamford, Conn., Technomic, © 1968, Preface; pp. 59–60.

Primary Examiner—Philip Anderson
Attorney, Agent, or Firm—Gust, Irish, Jeffers & Rickert

[57] ABSTRACT

A pad, especially an athletic pad, and particularly a pad for use in contact sports to protect the wearer, in which a film of plastic material is deposited on a support and then a body of the same material with a blowing agent therein is placed on the film and the pad member is then cured (gelled and fused) with simultaneous blowing of the added body of material. The pad member is formed so that different regions thereof are different in thickness to provide for increased protection in the thicker regions while flexibility is maintained in the thinner regions of the pad member. The addition of at least one elastic strap element to the pad for retaining it in position on the body completes the construction of the pad member.

24 Claims, 13 Drawing Figures

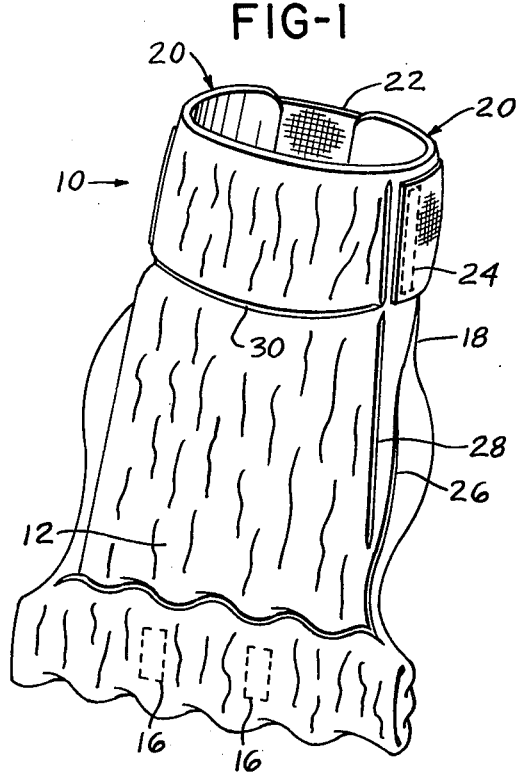
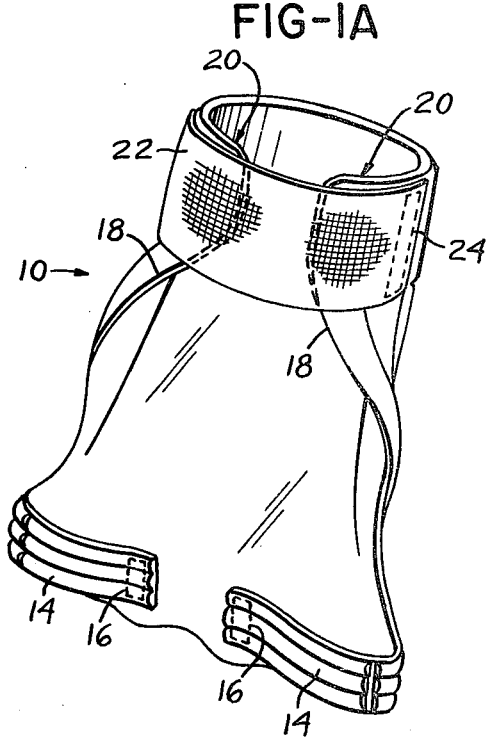
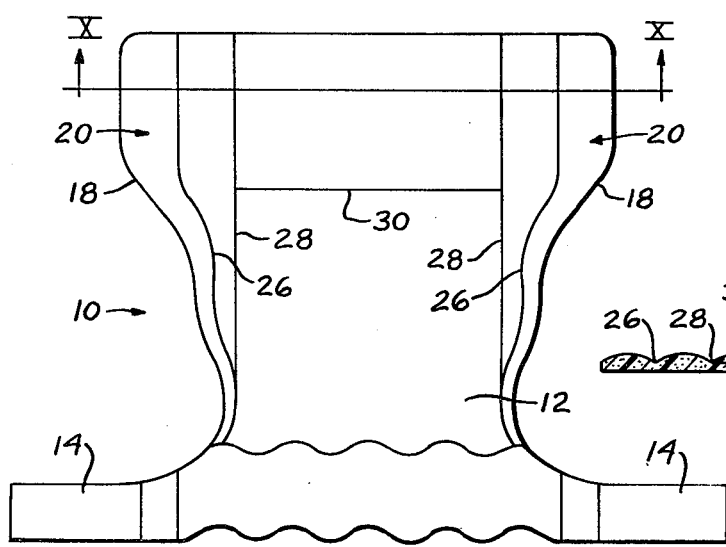
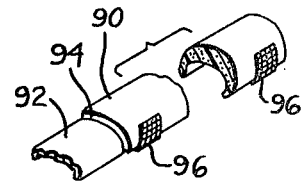
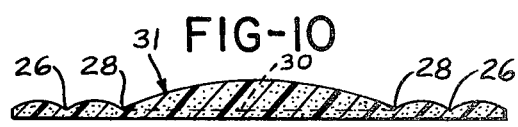
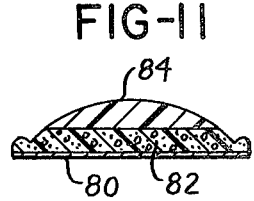

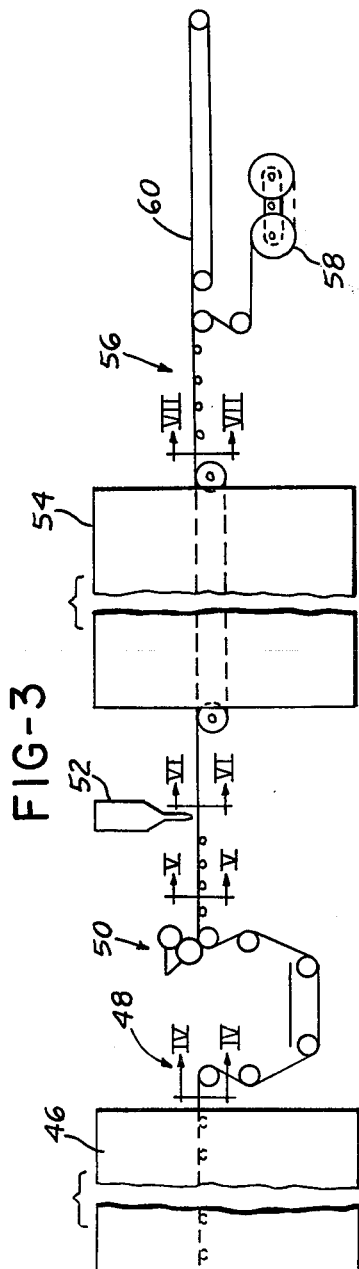
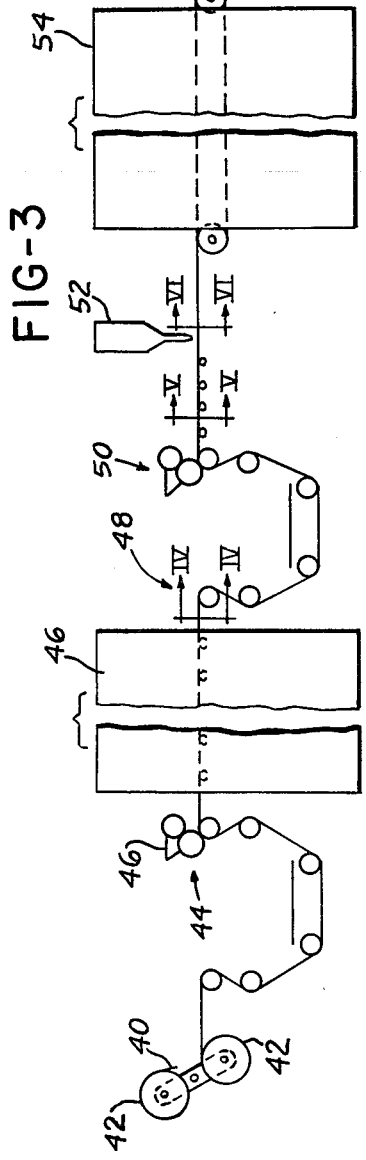
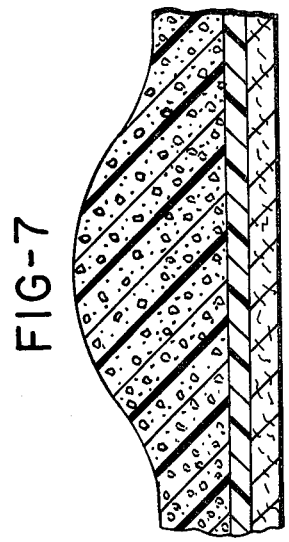
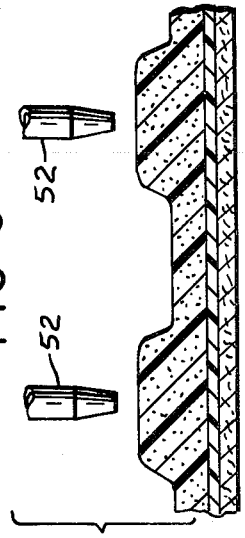
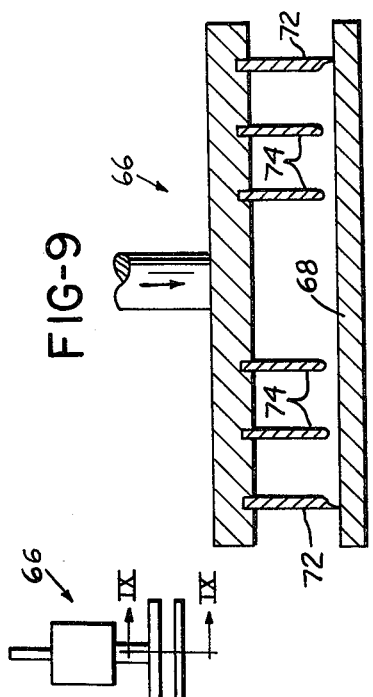
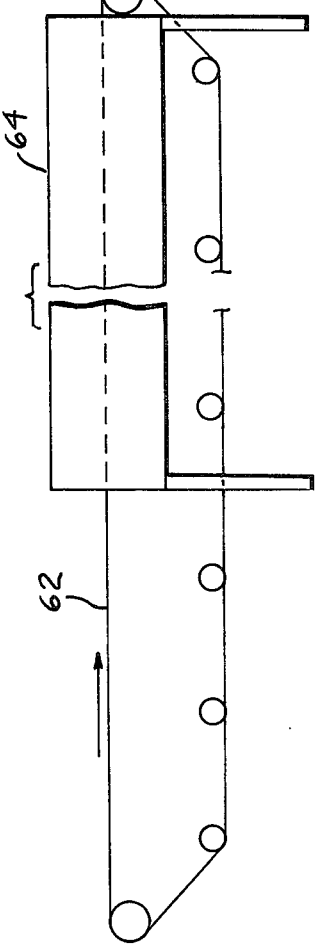

PAD MEMBER METHOD OF MANUFACTURE

The present invention relates to pads, especially for providing protection to the body, particularly for use in contact sports and more particularly to a method for making such pads.

Pads of the nature with which the present invention is concerned are well known and are widely used in contact sports such as football, basketball, soccer and the like and have proved to be highly effective for protecting the body against, at least, bruising upon contact.

At an earlier date, such pads were fabricated from combinations of leather, cloth, fabrics, plastics and the like, and some thereof were reinforced with relatively rigid materials. Pads of this nature are cumbersome and expensive and are subject to deterioration.

Other pad arrangements according to the prior art have been constructed by fabricating pieces of foamed material to the desired shape by cementing the pieces together, but these pads, while representing an improvement in respect of the material employed, still tend to tear apart where joined by cement and they are also porous and absorb perspiration and are, in general, still an inferior product.

Still later, and as disclosed in my issued U.S. Pat. No. 3,446,880, pads of the nature referred to were formed by depositing a skin of curable plastic material on a mold form and at least partially curing the skin and then depositing thereon a body of the same plastic material containing a blowing agent and at least partially blowing or curing this portion of the pad and then adding a further layer of plastic material free of blowing agent on top of the body of material and then curing the pad.

A pad manufactured in this manner is manufactured to a predetermined contour by the use of molds of a desired shape so that the pad, when completely cured, will generally conform to that part of the body which it is to protect. Such pads, when provided with elastic straps or the like to hold the pads in place, represented a substantial improvement over the pads referred to above but were relatively expensive to manufacture and required rather expensive forms or molds to produce pads of the proper configuration.

The present invention proposes an improved method for making the pad which eliminates the drawbacks referred to above and by means of which a superior pad can be manufactured at reduced cost.

BRIEF SUMMARY OF THE INVENTION

According to the present invention, resilient protective pads for attaching to the human body are prepared by forming a flat skin by depositing a layer of plastisol resin material free of blowing agent on a surface.

The surface is a moving surface so that the application of the skin forming material can be continuous. After the skin forming material is placed on the surface, the surface passes through a first oven where the plastisol resin material is at least partially fused on the support. Thereafter, the support moves the now gelled skin past a further station where a layer of the same plastisol resin material with a blowing agent therein is deposited on the skin.

The support then moves the material past a further station where more of the same plastisol resin material containing a blowing agent is deposited in selected lateral regions of the moving material. The pad material is then passed through a blowing oven where it is heated for a sufficient length of time to fuse all of the plastisol resin material and to accomplish the blowing of the material containing the blowing agent. The material, after being cooled, is then stripped from the support and is prepared for further processing.

The further processing of the material takes the form of conveying the material through an oven to heat the material to a desired degree and then die stamping the material as it emerges from the oven to form substantially flat elements of a desired contour which, when provided with straps or the like to hold the pad in place on the body, represents a completely finished member.

A particular object of the present invention is the provision of an improved protective pad for the human body and a method and apparatus for making the pad.

A further object of the invention is the provision of a method and apparatus for making a protective pad for the human body in which molds of different contours to make pads of different configurations are not needed.

A still further object of the invention is the provision of a resilient protective pad member and a method of manufacture thereof in which the degree of protection provided by the pad member can be varied in different regions thereof while not impairing the flexibility of the pad member.

The exact nature of the present invention will become more clearly apparent upon reference to the following detailed specification taken in connection with the accompanying drawings in which:

FIG. 1 is a perspective view showing one form of pad constructed according to the present invention.

FIG. 1A is a perspective view showing the opposite side of the pad of FIG. 1.

FIG. 2 is a view looking at the pad in flattened out condition as it comes from the molding, fusing and foaming apparatus and prior to the securing of an elastic strip thereto.

FIG. 3 is a schematic view showing the apparatus in which the basic pad material is deposited on a support, fused and cured foamed.

FIG. 4 is a sectional view showing the support with a skin formed thereon and is indicated by line IV—IV on FIG. 3.

FIG. 5 is a view indicated by line V—V on FIG. 3 showing the pad material after the first layer of plastisol resin material containing a blowing agent is deposited thereon.

FIG. 6 is a view indicated by line VI—VI on FIG. 3 showing the member with additional plastisol resin material containing a blowing agent deposited in selected lateral regions thereof.

FIG. 7 is a view like FIG. 6 but shows a portion of the pad material at enlarged scale after it emerges from the blowing oven.

FIG. 8 is a schematic view showing a further step in the processing of the material and including the final die stamping operation.

FIG. 9 is a view indicated by line IX—IX on FIG. 8 showing somewhat schematically the construction of the die by means of which the pad material is cut into individual pieces.

FIG. 10 is a section indicated by line X—X on FIG. 2 showing how the die of FIG. 9 is operable to form thin regions in the pad material in addition to cutting the pad material to the desired shape, the said thin regions forming preferred bending lines for the pad.

FIG. 11 is a view showing a pad member having a relatively hard layer thereon.

FIG. 12 is a view showing a protector for covering the forearm and a portion of the back of the hand.

DETAILED DESCRIPTION OF THE INVENTION

Referring to the drawings somewhat more in detail, and with particular reference to FIGS. 1 and 2, the pad designated by reference numeral 10 in FIG. 1 comprises a hand or knuckle pad and is adapted to cover the back of the hand and extend at least a short distance down over the knuckles at the finger end and a short distance upwardly beyond the wrist at the other end.

Advantageously, the pad also partially encloses the sides of the hand and is sufficiently flexible to permit the fingers and thumb to be used in the normal manner.

The pad 10 of FIG. 1 will be seen to be formed from a blank 12 shown flat in FIG. 2. The flat blank 12 will be seen at the finger end to have outwardly extending strap portions 14 which, as will be seen in FIG. 1A, are of sufficient length to be folded inwardly and stitched to the main body of the pad as at 16. Each protruding strap 14 thus forms a loop for receiving a respective finger when the pad is placed on the hand.

Toward the opposite end of the pad, the flat pad blank 12 flares outwardly as at 18 and the edge portions of the flared out parts 18, generally indicated at 20 in FIG. 2, are straight and parallel and form regions to which an elastic band 22 is stitched as by stitching 24. The blank 12 may include fabric reinforcing in the regions 20 if so desired, but, in the normal course of events, it is not necessary to provide such reinforcing.

The pad is formed with thinned regions 26, 28 and 30 which form lines where the pad will bend relatively easily when it is mounted on the hand. The line at 30, for example, permits the pad to bend in the region of the wrist, and the lines at 26 and 28 permit the side edges of the pad to conform to the contour of the hand.

As will be seen hereinafter, the strips 14 are also treated so as to be relatively flexible and relatively thin as opposed to the remainder of the pad member.

Reference to FIG. 10, which shows the strap end of the blank on which the pad is formed in cross section, will show the relative sizes of the thinned out or compressed regions 26, 28 and 30 which provide for preferred bend lines for the pad.

The central region of the pad at 31 is of increased thickness to provide for increased protection.

Turning now to the apparatus in which the pad material is made, reference may be had to FIG. 3. In FIG. 3, an indexable carrier 40 is provided which carries reels 42 of paper support material which may be embossed, at least on the outwardly facing surface, to impart a desired surface texture or configuration to the material to be supplied thereto. The paper is fed from the one of the reels in working position over a group of rollers to a coating station generally indicated at 44 and which may comprise a reverse roller coating device of a known nature and which will transfer a uniform layer of plastisol resin material from a supply hopper 46 to the surface of supporting paper web 42.

The thus uniformly coated paper web then passes through a gelling and partially fusing oven 46 wherein the material is subjected to heat on the order of about 360 degrees Fahrenheit for about one minute. The preferred thickness for the layer is about 17 to 20 mils and the preferred material is vinyl resin material free of a blowing agent.

The paper carrying the vinyl resin skin now passes through a cooling station 48, indicated by the arrow, wherein the vinyl resin film and the support strip are caused to cool by passage of air thereover. The air can be supplied by a blower at the roller adjacent the end of the arrow, or the entire space where the film and support strip are exposed can form a cooling region. At the exit end of cooling station 48, there is a further roller coater station 50 which supplies to the vinyl resin skin a layer of flowable vinyl resin material having a blowing agent therein. This layer may be from about 20 mils up to about one-sixteenth inch thick.

The support paper with the skin with a layer of foamable vinyl resin material thereon then passes beneath a group of coaters 52 which supply additional ribs of the vinyl resin material with a blowing agent therein in one or more selected lateral regions for increasing the thickness of the pad material in the respective region, or regions. The material is then passed directly into the further fusing and blowing or foaming oven 54 within which it is subjected to a temperature of about 360 degrees Fahrenheit for a period of about twelve minutes.

The vinyl resin material containing the blowing agent therein applied in each of stations 50 and 52 may consist of about 100 parts of a vinyl resin material and about 7 parts blowing agent which can be of any of several types available commercially with the one specifically employed being known as KEMPOR SDA 200. The vinyl resin material is, of course, made readily flowable by dispersing it in a suitable plasticizer. A suitable material for making the pads has been found to be a dispersion of polyvinyl chloride resin in liquid plasticizers, for example, the phthalate plasticizers.

After the support strip emerges from the oven, a cooling of the strip and the fused and foamed vinyl resin material thereon is provided for in region 56 and thereafter the material is stripped off from the paper carrier and the paper carrier is wound up on a take up reel 58 and then may subsequently be returned to carrier 40 for re-use. The material stripped off from the paper carrier is delivered to a delivery conveyor 60 and is advantageously cut off in predetermined lengths when it is taken off the delivery conveyor so that the resulting slabs of material can be stored and thereafter further processed at a convenient time to make the finished product.

The further processing of the material is carried out in a second operation in which the material is reheated and then stamped while hot to a desired contour and cross sectional configuration.

At this point, it will be appreciated that, inasmuch as the material coming out of oven 54 is completely fused and foamed, die cutting and forming of the material could take place at the exit end of oven 54. It is a matter of convenience that the material is cut into slabs and stored and thereafter reheated and passed through a stamping station. The important thing about the stamping is that cold, or unheated, stamping tools are employed for stamping and forming hot, blown plastic material, rather than to supply the plastic material cold to a set of heated dies. It is, of course, possible to deform the plastic material under the influence of heat and pressure even though the plastic material is fully fused and foamed.

In any case, the slabs of material which have been removed and delivered by conveyor 60 are supplied to a further conveyor 62 of the reheating and hot stamping line of FIG. 8 and conveyed through a reheating oven 64 in which the material may be brought up again to about 300 degrees Fahrenheit. The material then passes to a stamping station 66 having die members generally configured as shown in FIG. 9.

It will be understood that the strip referred to could be the width of a single pad member or of several pad members and that each slab referred to could be the length of one work member or of several work members.

In FIG. 9, it will be seen that the stamping die in stamping station 66 has a bottom plate 68 and a movable top member 70 having a sharp peripheral portion 72 operable to sever the plastic material along a closed path thereby to form an article of the desired shape. The member 70, furthermore, comprises ribs 74 having blunt ends and being spaced from plate 68 in the maximum advanced position of plate 70. The ribs are the ribs which form the thinned out compressed regions of the plastic member and which regions, as mentioned, form preferred lines about which the material bends.

The straps 14 may, at this time, be substantially completely flattened out to impart flexibility thereto which can be done without impairing the strength of the straps 14. Further, the straps could be provided with one or two ribs extending longitudinally therealong if so desired.

The pad member, when removed from the stamping station, is completed by turning the straps 14 inwardly as shown in FIG. 1 and stitching the free ends thereof in place and by stitching the ends of elastic strap 22 to the regions 20 of the pad.

The coaters 52 have been referred to as supplying one or more ribbons of blowable or foamable vinyl resin material to the strip of foamable vinyl resin material being processed. However, one or more such coaters could be positioned as shown and supply a plastic material which becomes relatively hard or stiff when cured. Numerous plastic materials are available for this purpose. Such a layer of relatively hard, or stiff, material will tend to distribute loads over a greater area thus providing greater protection.

FIG. 11 shows a pad member in which the first, or skin, layer is indicated at 80 with a blown elastomeric layer 82 thereon and with an unblown layer 84 on layer 82 with layer 84 being relatively stiff or hard.

FIG. 12 shows an arm protector in which a member, constructed substantially like the pad of FIGS. 1 and 1A, and having a portion 90 to cover the forearm and a portion 92 to cover the back of the hand, with a flexible thin connecting region 94. Elastic straps 96 are fastened to the pad to secure it to the arm.

Modifications may be made within the scope of the appended claims.

What is claimed is:

1. A method of making a resilient member for use in the forming of pad members for mounting on the body in protective relation thereto comprising; applying a first layer of a plastisol resin material in flowable form onto an elongated moving support member and subjecting the first layer to heat for gelling and at least partially fusing said first layer, applying a second layer of the same plastisol resin material in flowable form but containing a blowing agent to the first layer in substantially laterally coextensive relation thereto, applying a third layer of a plastisol resin material in flowable form in the form of a ribbon over at least one selected lateral region of said second layer and of a lateral extent less than that of the second layer, subjecting the superposed layers to further heat fuse and foam the layers of plastisol resin materials while integrally bonding the layers thereof together, and stripping the bonded, fused and foamed material from said support member.

2. The method according to claim 1 in which said support member is a paper web.

3. The method according to claim 1 in which said support member is a paper web having a contoured surface on at least the side facing said first layer.

4. The method according to claim 2 in which said paper web is fed from a supply reel thereon and is taken up on a take up reel and is re-used a plurality of times.

5. The method according to claim 1 which includes stamping out contoured pad members from said fused and foamed material.

6. The method according to claim 1 which includes cutting contoured pad members from the fused and foamed material by pressing a sharp cutting blade of the desired contour against the fused and foamed material from the side of said fused and foamed material having said first layer thereon.

7. The method according to claim 6 which includes supporting said fused and foamed material on a planar surface during said cutting operation so as to cause the side of the fused and foamed material facing said cutting blade to curve downwardly at the periphery to the cutting line.

8. The method according to claim 5 in which said fused and foamed material is stamped while in heated condition.

9. The method according to claim 8 in which said fused and foamed material is stamped while it is still hot from said heat fusing and foaming thereof.

10. The method according to claim 8 in which said fused and foamed material is cooled following the heat fusing and foaming thereof and is thereafter reheated and then stamped while in reheated condition.

11. The method according to claim 5 which includes forming preferred bend lines in selected regions of said pad member by pressing blunt edged bars against the fused and foamed material in said selected regions.

12. The method according to claim 11 in which said bend lines are formed in said pad member simultaneously with the stamping out of said pad members.

13. The method according to claim 6 which includes cutting said fused and foamed material while heated and simultaneously with said cutting forming preferred bend lines in said pad member in selected regions thereof by pressing blunt edged bars against the fused and foamed material in said selected regions.

14. The method according to claim 5 which includes forming loops on said pad member to receive body portions.

15. The method according to claim 5 which includes connecting elastic strap means to said pad member for mounting of the pad member on the body.

16. The method according to claim 14 in which at least one said loop is in the form of a tab of fused material having the free end folded over and connected to the pad member.

17. The method according to claim 1 in which the material of at least said first and second layers is a vinyl resin material and the heat supplied thereto is on the order of about 360 degrees Fahrenheit.

18. The method according to claim 17 in which said first layer is subjected to heat the first time for about one minute while heat is supplied to the superposed layers for the final fusing for about twelve minutes.

19. The method according to claim 1 which includes cutting off the fused and foamed material in lengths and stacking the lengths for storage.

20. The method according to claim 19 which includes reheating the lengths and effecting stamping out and forming bend lines therein while the material is hot.

21. The method according to claim 1 wherein the vinyl resin material of the third layer contains a blowing agent.

22. The method according to claim 21 in which said first layer is up to about one-sixteenth inch thick when deposited and said second and third layers are up to about one-fourth inch each in thickness when deposited and said second and third layers are foamed to up to about one-half inch each in thickness during the fusing thereof.

23. The method according to claim 1 wherein the vinyl resin material of the third layer is blowing agent free and fusible to a relatively stiff form.

24. A method of making a resilient member for use in the forming of pad members for mounting on the body in protective relation thereto comprising: applying a first layer of a plastisol resin material in flowable form onto an elongated moving support member and subjecting the first layer to heat for gelling at least partially fusing said first layer; applying a second layer of the same plastisol resin material in flowable form but containing a blowing agent to the first layer; forming the blowing agent containing plastisol resin material to a thickness on the support member which varies laterally but which is substantially constant in the direction of elongation; subjecting the superposed layers to further heat to fuse and foam the layers of plastic resin material while integrally bonding the layers thereof together; stripping the bonded, fused and foamed material from the support member; stamping out pad members from the bonded, fused and foamed material and forming preferred bend lines in selected regions of the pad member by pressing blunt edged bars against the bond, fused and foamed material in the selected regions.

* * * * *

UNITED STATES PATENT AND TRADEMARK OFFICE
CERTIFICATE OF CORRECTION

PATENT NO. : 4,173,814
DATED : November 13, 1979
INVENTOR(S) : James H. Enicks

It is certified that error appears in the above-identified patent and that said Letters Patent are hereby corrected as shown below:

Column 1, line 60, "gelled" should be ---cured---.

Column 2, line 40, cancel "cured".

IN THE CLAIMS

Claim 1, Column 6, line 2, after "heat" insert ---to---.

Claim 24, Column 8, line 6, after "gelling" insert ---and---.

Claim 24, Column 8, line 14, "plastic" should be ---plastisol---.

Claim 24, Column 8, line 20, "bond" should be ---bonded---.

Signed and Sealed this

Twenty-second Day of January 1980

[SEAL]

Attest:

Attesting Officer

SIDNEY A. DIAMOND
Commissioner of Patents and Trademarks